March 19, 1963     M. T. THORSSON     3,081,831
WEIGHING SCALE WITH REMOVED MATERIAL INDICATOR
Filed June 27, 1958
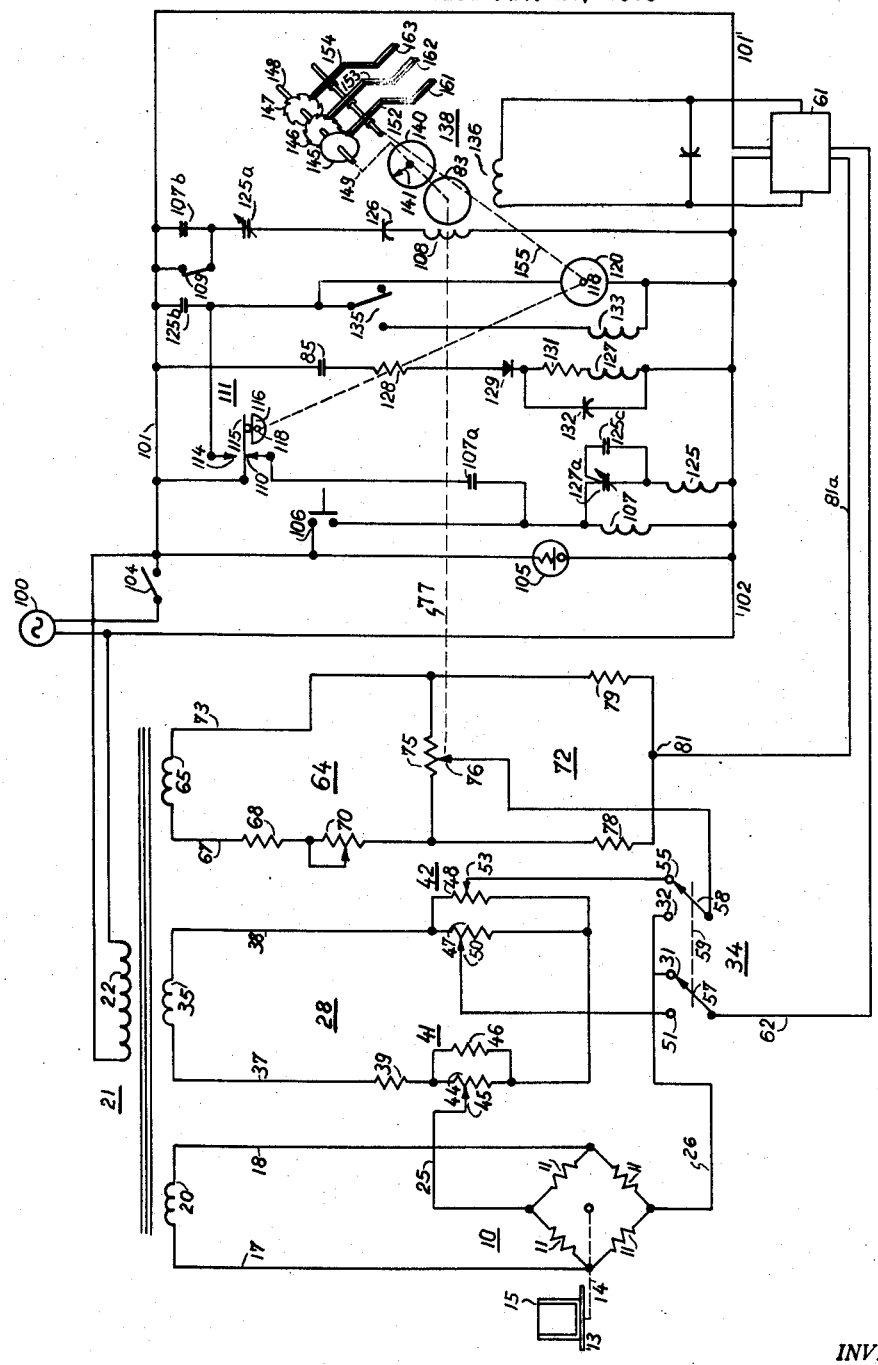
INVENTOR.
MATTHEW T. THORSSON
BY
George A. Woodruff

United States Patent Office 3,081,831
Patented Mar. 19, 1963

3,081,831
WEIGHING SCALE WITH REMOVED MATERIAL INDICATOR
Matthew T. Thorsson, East Moline, Ill., assignor to Fairbanks, Morse & Co., Chicago, Ill., a corporation of Illinois
Filed June 27, 1958, Ser. No. 745,019
4 Claims. (Cl. 177—12)

This invention relates to electronic weighing scales and more particularly to such scales in which the amount of material removed from a container is shown directly as a positive value by an indicator or recorded in permanent form by a printing apparatus.

The conventional practice for weighing out material from a container has been to determine the total numerical weight of the material, subtract the numerical amount of material to be removed and then watch an indicator until the pointer reads the weight representative of the difference between these two figures. Thus, if the total weight of the material is 952 pounds and it is desired to remove 143 pounds, the difference after subtraction is 809 pounds. The operator then removes enough material to reduce the indicator reading from 952 pounds to 809 pounds. However, the arithmetic operation of subtraction is subject to human errors and is particularly troublesome when numerous small amounts are to be taken in separate loads from a single large amount. The difficulty is compounded in ingredient batching operations when a complete batch of chemicals may have to be discarded because of an error in subtraction by the operator.

In general, the present invention automatically measures the amount of material removed from a container and registers this amount as a positive value in a printing mechanism controlled by the weighing system. In accomplishing this result, there is provided a transducer coupled to a platform on which the container rests to produce a voltage signal whose amplitude is proportional to the total load on the platform including the platform, the container and the material carried therein. There are also provided two voltage generating circuits, the first of which is preset to produce a voltage equal in magnitude but of inverse phase to that generated by the transducer less that part of the transducer voltage attributable to the weight of the platform and the container. This latter part of the transducer voltage is eliminated from the system by either a separate zero balance circuit or by an additional element incorporated in the first voltage generating circuit.

The second of the two voltage generating circuits generates a voltage in phase with that of the transducer and of inverse phase with respect to that of the first voltage generating circuit. An amplifier and balance detector is connected in series with the output circuit of the transducer, and each of the voltage generating circuits so as to reflect at its input terminals the summation of the amplitudes of the various voltages in series. The input voltage to the amplifier will be referred to hereinafter as the "error voltage."

The amplifier and balance detector has its output circuit connected to a reversible two phase servomotor which responds to the output signal. The servomotor is connected to an adjustable potentiometer in the second voltage generating circuit so as to rebalance the weighing system by reducing the error voltage to zero. The servomotor is connected to a printing assembly so as to simultaneously adjust elements of a recording printer so that a permanent record of the weight of the amount of material removed from the container may be made.

As an additional feature, the balance detector controls the printer so that the latter cannot print unless and until the weighing system is in balance, thus insuring a correct recordation of the true weight of the removed material.

From time to time it may be desirable to know the weight of the material left in the container so as not to attempt to remove more material than is left at any time. To accomplish this, the weighing system is arranged so that the relative phase of the voltage signals generated by the transducer and the second voltage generating circuit is inverted and the voltage signal generated by the first voltage generating circuit is in effect eliminated from the system. Under this condition, the printer will record the true weight of the material yet remaining in the container.

It is an object of the present invention to provide a novel weighing scale which overcomes the disadvantages of prior art weighing systems.

It is a further object of the present invention to provide a weighing system in which the amount of material removed from a container is indicated directly as a positive value without unnecessary computations on the part of the operator.

It is a further object of the present invention to provide a scale which not only indicates the amount of material removed from a container but also indicates, if desired, the amount of material remaining in the container.

It is yet another object of the present invention to provide a weighing scale which permits printing a record of the weight of the material directly in permanent form, only at times when the system is in balance.

With the foregoing, and other objects in view, the invention resides in the following specification and appended claims, an embodiment of which is illustrated in the accompanying drawing in which the single view is a schematic diagram of the electrical circuitry comprising the invention.

In the drawing the relay contacts are designated with reference to their operating windings by placing a small letter after their number which is the same as the number designation of their associated winding. Thus, for example, a relay winding designated as 125 is associated with and controls the operation of contacts 125a and 125b. Those contacts normally open (that is, open when their associated relay coil is de-energized) are shown as short paired parallel lines; those contacts normally closed (that is, closed when their associated relay coil is de-energized) are shown as short parallel lines with a slant line through the latter. Condensers are shown as a short straight line and a short arcuate line separated therefrom.

Referring more specifically to the drawing there is shown a load cell or transducer 10 of the bonded resistance strain gage type having the conventional four resistors 11 in a Wheatstone bridge arrangement. Such a load cell produces an output voltage signal, the amplitude of which is proportional to the force of weight applied thereto. A platform 13 is mechanically coupled to the load cell by a linkage 14. Linkage 14 may be a lever system, or if desired, the load cell may directly support the platform 13. A hopper or container 15, adapted to receive material is supported on platform 13.

The input A.C. voltage signal is applied to load cell 10 over conductors 17 and 18 which are connected to a secondary winding 20 of a transformer 21 whose primary winding 22 is connected to a source of alternating current as the source 100. The output voltage from load cell 10 is conveyed over conductors 25 and 26 to a first or zero balance network 28 and contacts 31 and 32 of a switch 34.

Zero balance or first voltage generating network 28 comprises a secondary winding 35 of transformer 21 in series with conductor 37, conductor 38, a resistor 39, a coarse zero balance potentiometer circuit 41 and a fine zero balance potentiometer circuit 42. Coarse zero balance potentiometer circuit 41 comprises a potentiometer 44, having a wiper 45 for adjustment purposes, connected to conductor 25 and a resistor 46 of fixed value in parallel therewith.

Fine zero balance potentiometer circuit 42 comprises two potentiometers 47 and 48 in parallel. Potentiometer 47 has a wiper 50 connected to contact 51 of reversing switch 34 and potentiometer 48 has a wiper 53 connected to contact 55 of switch 34.

Reversing switch 34 comprises contacts 31, 32, 51 and 55 as heretobefore described and two switch arms 57 and 58 mechanically ganged by a linkage 59 for simultaneous actuation. Switch 34 is manually operated from one to another of two positions. Arm 57 of switch 34 is connected to an amplifier and balance detector 61 over a conductor 62. Arm 58 of switch 34 is connected to a second voltage generating circuit 64.

Voltage circuit 64 comprises the series combination of a secondary winding 65 of transformer 21, conductor 67, a fixed resistance 68, a span adjustment potentiometer 70, a balance bridge circuit 72 and a conductor 73. Balance bridge circuit 72 comprises the series combination of a variable potentiometer 75, having a wiper 76, a resistor 78 and a resistor 79 each of the latter resistors being connected to a respective end of potentiometer 75. Resistors 78 and 79 are connected together at their other ends at a common junction 81. Wiper 76 is connected to arm 58 of reversing switch 34. Junction 81 of resistors 78 and 79 is connected by lead 81a to the input of amplifier and balance detector 61. Wiper 76 is mechanically linked to a servomotor shaft over a linkage 77 whose operation will be discussed hereinafter.

Amplifier and balance detector 61 may be of any known design, such as that more fully described and claimed in copending application entitled "Weighing Scale System with Weight Recorder," filed February 21, 1952, having Serial No. 274,166, now Patent No. 2,882,035, issued on April 14, 1959, by Louis J. Lauler and Matthew T. Thorsson and assigned to the present assignee. The amplifier portion of amplifier and balance detector 61 amplifies the signal applied thereto and applies its amplified output signal to the balance detector portion and also to the control winding of a servomotor 83 to effect operation of the servomotor in a manner to be described hereinafter. The balance detector controls the opening and closure of contacts 85. When the output signal from the amplifier is zero, contacts 85 open and at any time that there is an output signal from the amplifier, contacts 85 remain closed.

Referring now to the automatic balance and printing control circuit, a source of 60 cycle A.C. power 100 (heretofore referred to) is connected to two conductors 101 and 102 in series with a conventional power switch 104. A conventional neon light 105 is connected between one side of switch 104 and conductor 102 to indicate the energization of the scale preparatory to its use. The series combination of a print button 106 and a relay coil 107 is connected between conductors 101 and 102 such that upon manual closure of button 106 relay coil 107 is energized. Print button 106 is spring urged to open upon removal of manual force from its actuating button.

Relay coil 107 upon energization closes its contacts 107a to complete its own holding circuit from source 100, over switch 104, conductor 101, contacts 110 of cam switch 111, contacts 107a, the winding of relay 107, and conductor 102 to source 100. Cam switch 111 comprises contacts 110 and 114 actuated by armature 115 and a cam 116 having a semi-circular periphery; the cam 116 is connected to the shaft 118 of a printer motor 120 and is rotatable therewith to open and close contacts 110 and 114. As shown, contacts 110 are normally closed, and contacts 114 are normally open.

Relay coil 107 also closed contacts 107b to complete an energizing circuit for the reference winding 108 of servomotor 83, which circuit extends from source 100 over switch 104, conductor 101, contacts 107b, normally closed contacts 125a of a servomotor and printer motor control relay 125, a condenser 126, winding 108 of servomotor 83, and conductor 102 to source 100. An alternate path for energizing reference winding 108 of servomotor 83 is completed over switch 109 in parallel with contacts 107b.

Servomotor and printer motor control relay 125 is energized over a circuit extending from source 100, over switch 104, conductor 101, contacts 110 of cam switch 111, contacts 107a, normally closed contacts 127a of a balance sensing relay 127, the winding of relay 125, and conductor 102 to source 100. Relay 125 controls operation of contacts 125a which are in series with the energizing path for the reference winding of servomotor 83 and interrupt its operation during the printing cycle. Relay 125 controls operation of contacts 125b which complete an energizing path for printer motor 120. Relay 125 also controls operation of contacts 125c which completes its own holding circuit.

Referring to the printer motor 120, its energizing circuit extends from source 100, over switch 104, conductor 101, contacts 125b, printer motor 120, and conductor 102 to source 100; an alternate holding circuit for continued operation of printer motor 120 is formed upon partial rotation of its shaft 118, after it has started its cycle of operation. This latter holding circuit extends from source 100, over switch 104, conductor 101, contacts 114 of cam switch 111, the winding of printing motor 120, and conductor 102 to source 100.

Balance sensing relay 127 is energized in conjunction with contacts 85 of the balance detection circuit 61 over a circuit extending from source 100, over switch 104, conductor 101, normally open contacts 85, a current limiting resistance 128, a rectifier 129, a second current limiting resistance 131, the winding of relay 127, and conductor 102 to source 100. A condenser 132 which controls the delay time of the de-energization of relay 127 is connected in parallel with resistance 131 and winding 127.

A relay winding 133 is energized over a circuit extending from source 100, over switch 104, conductor 101, contacts 125b (or contacts 114 of cam switch 111 in an alternate path), a switch 135, the winding of relay 133, and conductor 102 to source 100. The purpose of relay 133 is to insert a printing slug (not shown) into the printing record to show that the scale is reading the removed weight in a positive manner, if such is the case. If the switch 135 is open, no such slug is used and the printing record will reflect the weight of the material remaining in the container to show that the scale is being used in its more conventional manner. If the switch 135 is closed, a slug or type member is actuated to insert into the printed record an indication of the use of the weighing system as a removed material indicator. Switch 135 is used in conjunction with reversing switch 34 and may, if desired, be mechanically linked thereto.

Referring now more particularly to servomotor 83, such servomotor may be of any conventional design and has a reference winding 108, and a control winding 136. The control winding 136 is connected to the output circuit of amplifier 61. The direction of rotation of servomotor 83 is dependent upon the phase of the input voltage to amplifier 61.

An indicator 138 having a chart member 140 and a pointer 141 is connected to the shaft of servomotor 83 and is rotatable therewith to indicate visually the weight of material on the scale platform or the weight of the removed material in accordance with which of the two operating conditions of the scale is desired.

For printing a permanent record there are provided a plurality of stepped selector discs 145, 146 and 147, each of which corresponds respectively to one of the numerical denominations hundreds, tens and units. The selector discs are connected to a common shaft 148 which is in turn mechanically linked to the shaft of servomotor 83 over a linkage 149. Thus, as the servomotor turns, the selector discs 145–147 are positioned. Additionally, fingers 152, 153 and 154 are arranged to be urged by printer motor 120 over a linkage 155 toward respective ones of the selector discs 145–147 and are positioned in accordance with the particular steps of their associated selector discs which they engage. Printing members 161–163 are respectively pivotally connected to fingers 152–154 so that their printing elements are aligned in accordance with the position of their respective fingers. A paper tape (not shown) is urged against the aligned printing elements by a hammer or striker (not shown) to record the digital weight information.

For details of the structure and operation of stepped selector discs 145–147, feelers 152–154 and printing elements 161–163, reference may be made to Patent No. 2,070,011, issued to H. A. Hadley et al., on February 9, 1937, and Patent No. 2,792,208, issued on May 14, 1957, to J. C. Merrill et al., both patents being assigned to the present assignee.

The operation of the scale of the present invention in recording, as a positive value, the weight of material removed from the scale will now be described. In the specific example, it will be assumed that the base weight or the weight of the material placed in the container 15 is 952 pounds and that it is desired to remove 143 pounds of material from the container.

The electrical circuit is prepared for operation by moving the reversing switch 34 to the position shown in the drawing with switch arm 57 connected to contact 31 and arm 58 connected to contact 55. Switch 135 is manually adjusted to its closed position, preparatory to utilize the slug during the printing cycle to indicate the removed material reading. Switch 104 is now closed to provide electrical power to the unit over bus lines 101 and 102, at which time indicator lamp 105 lights. The closure of switch 104 also applies 60 cycle A.C. voltage to the primary winding 22 of transformer 21 and thence to secondary windings 20, 35 and 65. Wiper 53 is rotated to its zero position (the lower end of potentiometer 48). Prior to the loading of material in container 15, coarse zero adjust potentiometer wiper 45 is adjusted to produce a zero reading on indicator 138 in the conventional manner. Under these circumstances the effect of the weight of the platform 13 and the container 15 is eliminated from the system.

The material which it is desired to distribute is then poured into container 15 in an amount in excess of that to be removed. In the assumed example 952 pounds of material is poured into container 15. It should be realized that it is not necessary to know the weight of the material since, as will become apparent, voltage balance circuit 28 is set to balance out the base weight without requiring the operator to know this factor.

At this time, transducer 10 responds to the weight of the material in the container (952) and generates a voltage signal whose magnitude is proportional thereto. Simultaneously, with the generation of the transducer signal, this signal is reflected at the input to the amplifier and detector circuit 61, since at this time there is no opposing voltage signal generated in balance circuit 28 to counter that produced by the weight of the material in the container 15; nor is there any voltage generated by the voltage circuit 64, since this circuit has not been moved from zero voltage output. Now, wiper 53 of potentiometer 48 is moved manually upwardly until the balance circuit 28 produces a sufficient countervoltage to equal that generated by transducer 10 representative of the weight of material in the container 15.

In setting potentiometer wiper 53 to its proper position, servomotor 83 is energized by closure of switch 109, which renders the energization of the servomotor 83 independent of the operation of the printing cycle. Servomotor 83 continues to respond to the error signal at the output of amplifier 61 during the adjustment of wiper 53, and continues to respond as long as switch 109 is closed. Should switch 109 be opened, servomotor 83 will respond only upon actuation of print button 106. Prior to the final setting of wiper 53, the phase of the input voltage to amplifier 61 is such as to cause the servomotor to move indicator 141 below its zero setting. As wiper 53 approaches its proper setting, the input signal to the amplifier 61 reduces toward zero and the servomotor moves in a direction to adjust pointer 141 toward a zero indication. When the pointer 141 reaches zero, the operator is aware that wiper 53 has been adjusted to its proper setting.

As the voltage of first balance circuit 28 increases, the error voltage at the input to amplifier 61 reduces to zero and reaches zero when the transducer voltage proportional to the base weight of 952 pounds equals the countervoltage generated in first balance circuit 28.

As material is removed from container 15, the weight of the removed material is reflected by a reduction in the output voltage of transducer 10 and causes an error signal to appear at the input to amplifier 61. In the assumed example 142 pounds have been removed and the transducer output voltage is reduced proportionally. Since the voltage of the first balance circuit 28 remains constant, as the transducer voltage decreases, there will appear an unbalance or error voltage at the input of amplifier 61. This error signal is amplified and appears across the control winding 136 of servomotor 83 and continues this motor in operation. Because servomotor 83 is energized, it balances the weighing system by moving tap 76 on rebalance bridge circuit 72 to introduce an amount of voltage equal to the reduction in voltage in the output circuit of transducer 10. At the same time the pointer 141 of indicator 138 moves upscale in accordance with the amount of rotation of servomotor 83 and indicates the weight of the material removed from the container.

As the voltage from rebalance bridge circuit 72 increases, the error voltage at the input of amplifier 61 reduces until it reaches zero value.

As previously explained, simultaneously with the rebalancing of the system, servomotor 83 moves indicator 141 over the face of chart 140 to give a visual indication of the amount of material removed from the container on indicator 138. At the same time servomotor 83 positions selector discs 145–147 over linkage 149 and shaft 148 to prepare for the printing of the permanent record of the weight. Selector discs 145–147 are moved in amount determined by the amount of rotation of servomotor 83. In the given example, since rebalance has occurred by adjusting rebalance bridge circuit 72 to generate a voltage equivalent to 143 pounds, the selector discs 145–147 are rotated in amount to reflect the removal of 143 pounds from container 15.

At this time, print button 106 is manually operated and completes the energizing circuit for relay 107. Relay 107 operates and at its contact 107a completes its own holding circuit and prepares an energizing circuit for relay 125.

As soon as balance of the system is reached, the balance detector portion of the circuit operates to open normally-open contacts 85 in the manner more fully described in the copending application having Serial No. 274,166, now Patent No. 2,882,035. The opening of contacts 85 interrupts the energizing path for balance sensing relay 127, after a time interval established by the discharge time of condenser 132. This delay time is introduced to insure that the proper balance condition exists.

When balance sensing relay 127 is de-energized, its normally closed contacts 127a operate to complete the energizing circuit for printer motor control relay 125. Relay 125 operates and at its contacts 125a interrupts the energizing circuit for the reference winding 108 of servomotor 83 to prevent its further rotation of selector discs 145–147. This is a protection circuit to prevent movement of the selector discs 145–147 during the remainder of the printing cycle and avoid either the recordation of an incorrect weight or the jamming of these discs. Upon its operation, relay 125 closes its contacts 125c to complete a holding circuit by shunting out contacts 127a.

Relay 125 further closes its contacts 125b to complete the energizing circuit for printer motor 120. Printer motor 120 operates to close contacts 114 and complete its own holding circuit thereover by operation of cam 116. At the same time printer motor 120 moves fingers 152–154 into engagement with their respective selector discs 145–147. Movement of the fingers 152–154 sets their respective printer elements 161–163 in proper positionment for printing the correct permanent record of the amount of material removed from the container 15.

Upon rotation of cam 116, contacts 110 are opened to interrupt the energizing circuit for relays 107 and 125 which then restore their respective contacts to their normal conditions in preparation for the next weighing cycle.

As cam 116 completes its revolution, contacts 114 are opened and the energizing circuit for the printer motor 120 is interrupted, whereupon it stops after the printing cycle.

After the desired amount of material has been removed from the container, there is left an amount less than that originally therein.

Therefore, the amplitude of the transducer output voltage is reduced by an amount proportional to the amount of material removed from the container. The output voltage of first balance circuit 28 remains constant, however, as wiper 53 of potentiometer 48 is left in its originally set position. At this time there is no unbalance or error voltage appearing at the input of amplifier 61 since the summation of the voltage produced by the transducer 10 plus that produced by the second balance bridge circuit 72 equals that provided by the first balance circuit 28.

Now, after an additional amount of material is removed from container 15, the output voltage of transducer 10 is reduced to reflect the lesser weight in the container. As a result there appears an unbalance or error signal at the input to amplifier 61. This error voltage is amplified and applied to the control winding of servomotor 83 which is prepared to rebalance the weighing system by readjusting second voltage bridge circuit 72.

The previously described cycle of balancing occurs and the weight of the material removed from the container is again recorded by closing of switch 106. In a similar manner the weights of subsequently removed material are recorded. It should be noted, however, that the weight readings are cumulative; that is, the numerical amount printed at any time is the summation of all the previous weights removed and represents the total weight of the material removed from the container.

As another feature of the weighing system of the invention, there is provided a means for measuring the weight of the material remaining in the container at any selected stage of weighing operation.

When the system is to be used to weigh the amount of material left in the container, the system is adjusted as follows. Before any material is placed in container 15, switch 34 is moved so that arm 57 mates with contact 51 and arm 58 with contact 32. At the same time switch 135 is moved to its open condition so that the type slug inserted by relay 133 is no longer used. There is thus a different indication printed on the permanent record for the weight of material removed from the container and for the weight of the material left in the container.

By placing the switch 34 in its presently described position, it should be understood that the phase of the voltage generated by the transducer and that generated by the second voltage circuit 64 are of inverse phase. Likewise, the voltage of the transducer and that of the first voltage balance circuit 28 are of inverse phase.

To complete the operating conditions, wiper 50 of potentiometer 47 in first voltage generating circuit 28 is adjusted so that the voltage generated by the transducer 10 attributable to the weight of the platform and the weight of the container is balanced out by that of the first voltage generating circuit. The adjustment of wiper 50 is reflected by operation of the servomotor 83 until the pointer 141 is set on zero on dial 140.

Assuming now that material has been added to the container and it is desired to record this weight in printed form, it will be readily understood that the transducer 10 generates a voltage whose amplitude is proportional to the weight of the platform, the container and the material therein. The voltage inverse phase generated by the first voltage balance circuit 28 reduces the amplitude of the transducer output voltage to an amount reflecting only the weight of the material in container 15.

This latter voltage being the only voltage at the input circuit of amplifier 61, appears there as an error voltage. This error voltage is amplified and applied to the control winding 136 of servomotor 83.

Print switch 106 is then manually operated and in the manner previously discussed servomotor 83 is fully energized and rotates in a direction to increase the output voltage of the second voltage circuit 64 by movement of tap 76. The servomotor 83 is energized either by closure of switch 109, or by closure of contacts 107 or under the control of print switch 106. Since the voltage of the transducer 10 and that of a second voltage circuit 64 are of inverse phase, the error signal at the input of amplifier 61 decreases as that of the second voltage circuit 64 increases. This action of the servomotor continues until the error voltage reaches zero value, whereupon the servomotor stops its rotation.

It will be recalled that selector discs 145–147 are positioned by servomotor 83 to prepare the printer for recordation of the weight.

As the error voltage reaches zero, the balance detector portion of the amplifier and balance detector 61 opens contacts 85, whereupon the previously described relay operation takes place and printer motor 120 is energized to complete the printing of the weight as established by the then positionment of selector discs 145–147.

After the printing cycle the relays of the circuit are restored to their normal condition in preparation for a subsequent weighing operation.

The present invention, therefore, weighs and prints the amount of material removed from a container as a positive numerical value, automatically after closure of switch contacts by an operator. There is no further need for the attendant to monitor the system as further weighing operations continue. If at any time the attendant desires to ascertain the amount of material yet remaining in the container, he merely moves a switch to a second position and continues as before to print a record of this condition.

While a specific embodiment of the present invention is herein shown and described other modifications, changes and rearrangements may be made by those skilled in the art without exceeding the scope of the appended claims.

I claim:

1. A weighing scale for indicating as a positive value, the weight of material removed from a base weight of material on the scale comprising: a transducer for generating a voltage whose amplitude is proportional to the instantaneous weight of material on the scale, a first voltage circuit for generating a voltage in phase opposition to said transducer output voltage, said first voltage circuit including first adjustable means settable for establishing the amplitude of said first voltage circuit to an amount equal to the amplitude of said transducer output voltage representative of tare weight and second adjustable means settable for establishing the amplitude of said first voltage circuit to an amount equal to the amplitude of said transducer output voltage representative of the base weight of material on the scale, a second voltage producing circuit connectable in series with said transducer and said first voltage circuit for generating a voltage having a selectable phase relation with the output voltage of said transducer, means for selecting the voltage phase relation of said second voltage circuit relative to the transducer comprising reversing switch means positionable selectively to connect the second voltage circuit with said first voltage circuit through one of said first and second adjustable means, means for changing the amplitude of the voltage of said second voltage circuit to an amount equal to the difference between the output voltage of said transducer and the output voltage of said first voltage circuit, and indicator means coupled to said last named means for indicating as a positive value the amount of material removed from said scale.

2. A weighing scale for indicating as a positive value, the weight of material removed from a base weight of material on the scale comprising: a transducer for generating a voltage whose amplitude is proportional to the instantaneous weight of material on the scale, a first voltage circuit for generating voltage in phase opposition to said transducer output voltage, said first voltage circuit including first adjustable means settable for establishing the amplitude of said first voltage circuit to an amount equal to the amplitude of said transducer output voltage representative of tare weight and second adjustable means settable for establishing the amplitude of said first voltage circuit to an amount equal to the amplitude of said transducer output voltage representative of the base weight of material on the scale, a second voltage circuit connectable in series with said transducer and said first voltage circuit for generating a voltage having a selectable phase relation with the output voltage of said transducer, means for selecting the voltage phase relation of said second voltage circuit relative to the transducer comprising reversing switch means positionable selectively to connect the second voltage circuit with said first voltage circuit through one of said first and second adjustable means, servomotor means operatively connected to said transducer, said first and second voltage circuits, said servomotor means being further connected to said second voltage means to adjust the amplitude of said voltage of said second voltage circuit to an amount equal to the difference between the output voltage of said transducer and the output voltage of said first voltage circuit, and indicator means coupled to said last means for indicating, as a positive value, the amount of material removed from the scale.

3. A weighing scale for indicating, as a positive value, the weight of material removed from a base weight of material on the scale comprising: a transducer for generating a voltage whose amplitude is proportional to the instantaneous weight of material on the scale, a first voltage circuit for generating a voltage in phase opposition to said transducer output voltage, said first voltage circuit including first adjustable means settable for establishing the amplitude of said first voltage circuit to an amount equal to the amplitude of said transducer output voltage representative of tare weight and second adjustable means settable for establishing the amplitude of said first voltage circuit to an amount equal to the amplitude of said transducer output voltage representative of the base weight of material on the scale, a second voltage circuit connectable in series with said transducer and said first voltage circuit for generating a voltage having a selectable phase relation with the output voltage of said transducer, means for selecting the voltage phase relation of said second voltage circuit relative to the transducer comprising reversing switch means positionable selectively to connect the second voltage circuit with said first voltage circuit through one of said first and second adjustable means, servomotor means operatively connected to said transducer, said first and said second voltage circuits, said servomotor means being further connected to said second voltage means to adjust the amplitude of said voltage of said second voltage circuit to an amount equal to the change in output voltage of said transducer upon removal of material from said scale, and printing means having sensed elements settable by said servomotor and having printing members settable in accordance with the positions of said elements to produce a printed record of the amount of material removed from the scale.

4. A weighing scale for indicating, as a positive value, the weight of material removed from a base weight of material on the scale comprising: a transducer for generating a voltage whose amplitude is proportional to the instantaneous weight of material on the scale, a first voltage circuit for generating a voltage in phase opposition to said transducer output voltage, said first voltage circuit including first adjustable means settable for establishing the amplitude of said first voltage circuit to an amount equal to the amplitude of said transducer output voltage representative of tare weight and second adjustable means settable for establishing the amplitude of said first voltage circuit to an amount equal to the amplitude of said transducer output voltage representative of the base weight of material on the scale, a second voltage circuit connectable in series with said transducer and said first voltage circuit for generating a voltage having a selectable phase relation with the output voltage of said transducer, means for selecting the voltage phase relation of said second voltage circuit relative to the transducer comprising reversing switch means positionable selectively to connect the second voltage circuit with said first voltage circuit through one of said first and second adjustable means, amplifier and balance detector means in series circuit with said transducer, said first voltage means and said second voltage means for sensing a condition of zero voltage in said series circuit, servomotor means operatively connected to said transducer, said first and said second voltage circuits, said servomotor means being further connected to said second voltage means to adjust the amplitude of said voltage of said second voltage circuit to an amount equal to the difference between the output voltage of said transducer and the output voltage of said first voltage circuit, printing means having sensed elements settable by said servomotor and having printing members settable in accordance with the positions of said elements to produce a printed record of the amount of material removed from the scale, and contact means controlled by said balance detector to prevent operation of said printing means until said zero voltage condition prevails.

References Cited in the file of this patent

UNITED STATES PATENTS

| | | |
|---|---|---|
| 1,602,218 | Zucker | Oct. 5, 1926 |
| 2,056,490 | Skavas | Oct. 6, 1936 |
| 2,610,052 | MacGeorge | Sept. 9, 1952 |
| 2,723,844 | Thurston | Nov. 15, 1955 |
| 2,766,981 | Lauler | Oct. 16, 1956 |
| 2,786,669 | Safford | Mar. 26, 1957 |
| 2,852,937 | Maze | Sept. 23, 1958 |
| 2,872,811 | Bergeson | Feb. 10, 1959 |